United States Patent Office 3,529,218
Patented Sept. 15, 1970

3,529,218
CERAMIC RECTIFIER AND A METHOD FOR
PREPARING THE SAME
Tsuneharu Nitta, Hiromitsu Taki, Kaneomi Nagase, and Shigeru Hayakawa, Osaka, Japan, assignors to Matsushita Electric Industrial Co., Ltd., Kadoma, Osaka, Japan
Filed July 26, 1968, Ser. No. 747,918
Claims priority, application Japan, July 28, 1967, 42/48,991; Apr. 26, 1968, 43/28,966
Int. Cl. H01g 9/16; H01l 7/02
U.S. Cl. 317—238
7 Claims

ABSTRACT OF THE DISCLOSURE

A ceramic rectifier is provided which is made up of a semiconductive (e.g. barium titanate) plate having a non-ohmic electrode on one surface thereof and an ohmic electrode on the other surface. The non-ohmic electrode consists essentially of 68 to 92.4% of silver and 7.2 to 32% of lead oxide+bismuth oxide in a mol ratio of 0.5 to 1.50. The titanate plate comprises barium nitrate of a gain size of 15 to 70 microns and has an electrical resistivity less than 10 ohm-cm. Such rectifiers are suitable for use in varistors.

---

This invention relates to novel rectifiers comprising semiconductive titanate ceramic and conducting electrodes mounted on said ceramic and having a current-voltage characteristic asymmetrical with respect to the polarity of applied voltage, and to the fabrication thereof.

There are now a number of different types of rectifier. The asymmetrical current-voltage characteristic is closely related to a potential barrier formed by a contact between two materials having different work functions. A rectifier, therefore, is constructed as follows: one surface of a semiconductor contacts with an electrode forming a potential barrier and the other surface contacts with an ohmic electrode. In the asymmetric characteristic, the forward current (I) may be expressed as a function of applied voltage (V) as follows:

$$I = I_{oe} V/\beta \qquad (1)$$

where $I_{oe}$ and $\beta$ are constants depending on the potential barrier. $\beta$ is the reciprocal of the slope in the log $I-V$ curve and can be written as follows:

$$\beta = \frac{V_1 - V_2}{2.303 \log (I_1/I_2)}$$

The $\beta$ exhibits a variation rate of voltage to logarithmic change in current. Therefore $\beta$ is a characteristic constant of the rectifier when the rectifier is used as a voltage stabilizing device, such as a conventional Si-varistor. Another characteristic constant is a voltage specified by a given current that ranges in the linear portion of the log $I-V$ curves. This voltage is tentatively termed varistor-voltage.

An asymmetric varistor requires a smaller $\beta$, higher varistor-voltage and lower cost. Although many efforts have been directed to the concurrent improvement of all these characteristics, entirely satisfactory results have not been obtained with the conventional rectifier such as Si-varistor.

It has been well known that barium titanate has a relatively low electrical resistance at room temperature (20° C. to 30° C.) when the barium titanate has incorporated therein a small amount of rare earth oxide such as cerium oxide, gadolinium oxide, samarium oxide and/or yttrium oxide or has been fired in an atmosphere containing small amount of oxygen. The ceramic is an n-type semiconductor in which current carriers are free electrons.

When silver paste is fired on the surface of the ceramic to form an electrode, a potential barrier is formed at the contact between the electrode and the ceramic. Therefore, a ceramic rectifier can be constructed when the other surface contacts with an ohmic electrode such as evaporated silver or gold. However, it was very difficult to obtain the required asymmetric varistor properties. This was attributed to the ambiguity of the origin of the rectifying action of the potential barrier layer formed at an interface between the ceramic material and metal electrode.

An object of this invention is to provide a rectifier comprising semiconductive titanate ceramic and electrodes and having a high non-linearity in the forward current-voltage characteristic.

Another object of this invention is to provide a method of preparation of semiconductive titanate ceramic with conducting electrodes characterized by high non-linearity in the forward current-voltage characteristic and high varistor voltage.

Such rectifiers are suitable for use in varistors. These and other objects of this invention will become apparent upon consideration of the following description taken together with the accompanying drawings in which.

Figure 1:
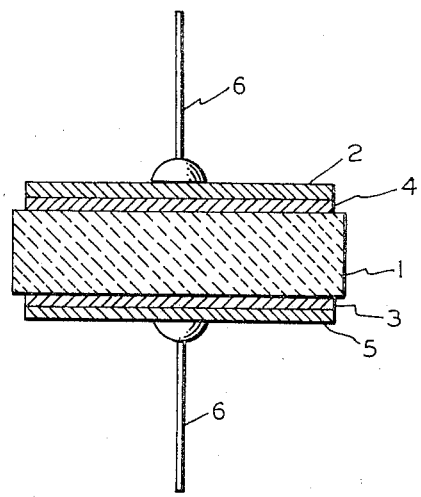
FIG. 1 is a view partly in elevation and partly in section through a preferred embodiment of the invention.

A ceramic rectifier according to the present invention comprises a semiconductive titanate having a non-ohmic electrode applied to one surface thereof and an ohmic electrode applied to the other surface thereof. Said non-ohmic electrode consists essentially of, as solid ingredients, 68 to 92.4% by weight of silver metal and 7.2 to 32% by weight of an additive combination of lead oxide and bismuth oxide in a mol ratio of 0.50 to 1.50 of lead oxide to bismuth oxide. The rectifying action takes place at the interface between said non-ohmic electrode and said semiconductive titanate.

It is important for achievement of the rectifying action that said non-ohmic electrode is prepared by applying, to one surface of said semiconductive titanate plate, an electrode pigment in a composition identical in the solid ingredients with that of resultant non-ohmic electrode and firing in an oxidizing atmosphere at 600° C. to 900° C. The rectifying action can not be obtained when said semiconductive titanate plate is heated in the oxidizing atmosphere at 600° C. to 900° C. and is provided with a silver electrode by a vacuum deposition method.

Said semiconductive titanate can be made of any titanate plate having low electrical resistivity which is not elevated to 10 ohm-cm. even when heated in oxidizing atmosphere at 600° C. to 900° C. A good result is obtained with barium titanate. The best result is obtained with barium titanate including, as additives, 0.10 to 4.20 wt. percent of silver oxide, 0.015 to 3.950 wt. percent of aluminum oxide, 0.015 to 4.10 wt. percent of silicon oxide and 0.04 to 1.80 wt. percent of an excess of titanium oxide.

A further important discovery is that the ceramic has no rectifying action when the material is provided with vacuum deposited silver electrode after an air-fired silver pigment electrode is taken off.

These results indicate that the firing process of the silver pigment imparts to the ceramic no effect with respect to the formation of rectifying action, that is, the ceramic material hardly oxidizes at the temperature of a firing-on process and there is little hope of this containing an oxide layer rectifier.

According to the present invention, the oxidation of the silver electrode during its firing process is responsible for the rectifying action. The diffusion length of oxygen in silver, under the conditions of a firing-on process, is calculated to be about 100 microns. The greater part of the oxygen dissolved in the silver electrodes evaporates during the cooling process because the solubility of oxygen in silver decreases with decreasing temperature. An electron diffraction pattern indicates that oxygen dissolved in the silver near the interface between silver metal and ceramic forms silver oxides and more difficultly evaporates than the oxygen near the free surface of the silver electrode. The physical properties of silver oxide are predominantly related to the rectifying action in connection with the partial pressure of oxygen in the atmosphere employed for firing the silver pigment.

Since silver oxide is a p-type semiconductor and semiconductive barium titanate is a n-type, the p-n heterojunction can be formed at the interface between them, and is related to the rectifying action.

According to the present invention, it has been discovered that varistor characteristics of the ceramic rectifier are strongly affected by combinations of the electrode pigment composition and the firing-on process. The present ceramic rectifier having smaller $\beta$ and high varistor voltage was found to be obtained by firing a combination of titanate ceramic and pigment consisting of silver and an additive combination of lead oxide and bismuth oxide at a temperature of 600° C. to 900° C. in an atmosphere containing oxygen. The inorganic binder concentrates at the interface between electrode and semiconductive titanate ceramic and lowers the defect density at the interface, so that the p-type characteristic of silver oxide formed at the interface can be enhanced by the incorporation therein of inorganic binder. Furthermore, the inorganic binder promotes the adhesion between electrodes and semiconductive titanate ceramic.

Referring now to FIG. 1, the disk shaped n-type semiconductive barium titanate ceramic 1 is provided with silver electrode 2 by firing-on a silver paste at 600° C. to 900° C. in air, and with an aluminum electrode 3 by evaporating aluminum metal. During the said firing process, the silver oxidizes near the interface between the electrode and the ceramic, and forms silver oxide 4 with incorporation of other metal oxide. Electrode 5 is provided on the aluminum electrode 3 by evaporating copper metal. Lead wires 6 are soldered to the electrodes 2 and 5 by a conventional lead-tin alloy solder.

The semiconductive barium titanate 1 can be prepared by mixing titanium oxide and barium carbonate in an equimolecular ratio with an addition of a small amount of an excess of titanium oxide, pressing into the form of a disc, and sintering at 1300° C. to 1400° C. in a non-oxidizing atmosphere. The mixture can be doped with aluminum oxide, silicon oxide and silver oxide and, when desired, can be calcined at 800° C. to 1000° C. prior to sintering. It has been clarified according to the present invention that the electrical properties of the rectifier are dependent upon the grain size and resistivity of the fired titanate ceramic. Good results have been obtained when the grain size is over a range of 15 to 70 microns and the resistivity is less than 10 ohm-cm.

Electrode compositions containing silver, lead oxide and bismuth oxide are prepared by using mixed powder. The pigment compositions are mixed with conventional organic binder such as polyester to form paste. The thus-prepared pigments are painted on one surface of the semiconductive barium titanate ceramic 1 and fired at 820° C. in air for 10 minutes. Cooling to room temperature (20° C. to 30° C.) is then carried out in air. Silver electrode 2 and silver oxide 4 with incorporation of other metal oxide are formed during the said firing process.

Aluminum electrode 3 exhibits an ohmic contact.

Copper electrode 5 is necessary to facilitate soldering lead wire 6.

The present ceramic rectifier exhibits a linear portion of log $I-V$ curves when a given current is more than a few milliamperes. For example, the varistor-voltage is determined as voltage in the forward current of 1.5 ma. and is expressed by $V_{1.5}$ ma. $\beta$ is computed from $V_{1.5}$ ma. and $V_{15}$ ma.

Figure 2:
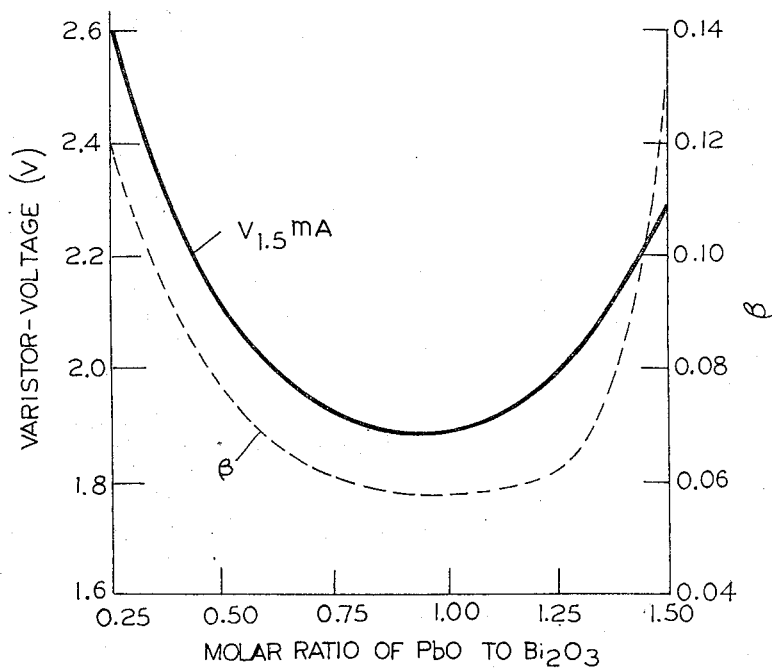
FIG. 2 is a graph illustrating effects of molar ratio of lead oxide to bismuth oxide on the electrical properties of rectifiers according to the invention.

Referring to FIG. 2 wherein effects of molar ratio of lead oxide to bismuth oxide are illustrated as a function of $V_{1.5}$ ma. and $\beta$ of barium titanate with conducting electrode comprising silver metal and 20 weight percent of combined lead oxide and bismuth oxide, and firing in air at 820° C. for 10 minutes, the electrical properties of the rectifier are strongly affected on an addition of combined lead oxide and bismuth oxide. An addition of only lead oxide or bismuth oxide does not produce a rectifier with desirable electrical properties. Operable molar ratio of lead oxide to bismuth oxide is 0.50 to 1.50 and optimal molar ratio is 0.75 to 1.25.

Figure 3:
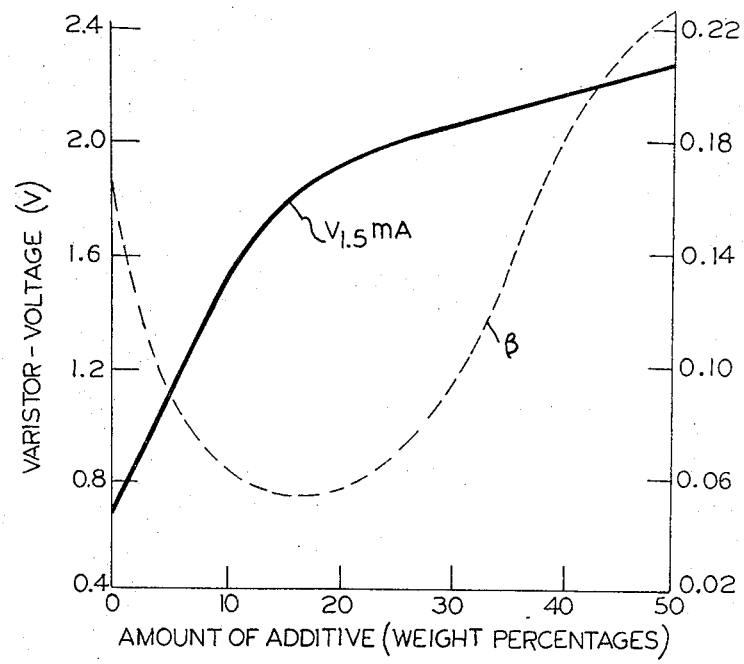
FIG. 3 is a graph illustrating effects of amounts of additive combinations in various molar ratios on the electrical properties of rectifier according to the invention.
Figure 4:
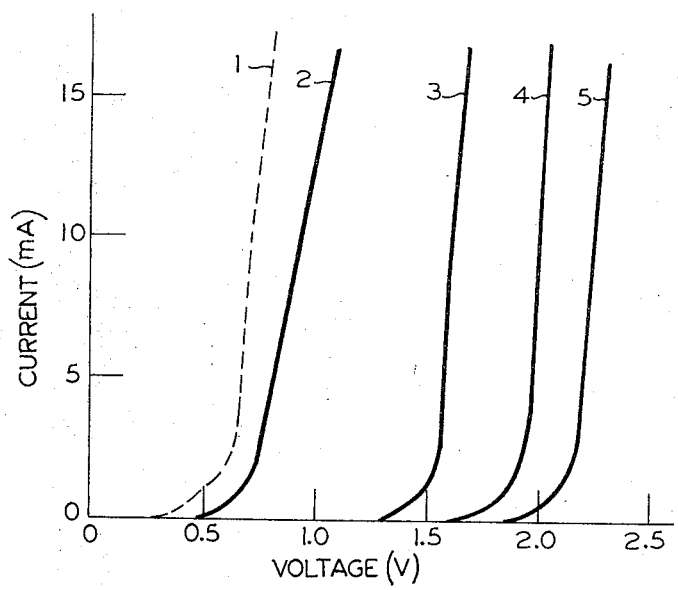
FIG. 4 is a graph illustrating a current vs. voltage curve of rectifiers according to the invention.

Referring to FIG. 3 wherein percentages by weight of additive combinations of lead oxide and bismuth oxide are plotted against $V_{1.5}$ ma. and $\beta$ of barium titanate with conducting electrode comprising silver metal and an additive combination of lead oxide and bismuth oxide, and firing in air at 820° C. for 10 minutes, the amounts of said additive combination also have remarkable effects on $V_{1.5}$ ma. and $\beta$. Lower or higher percentages by weight of said additive combination do not produce a desirable rectifier; operable weight percentages of the additive combination are 7.2 to 32% by weight and optimal weight percentages are 10 to 25% by weight. The pigment containing silver-lead oxide-bismuth oxide powder results in better forward current-voltage characteristic than pigment containing only silver.

According to the present invention, the firing-on atmosphere is very effective on the rectifying action of the ceramic rectifier, for example, a firing atmosphere of low oxygen content, such as nitrogen atmosphere, inhibits the rectifying action. While air is the preferred oxidizing atmosphere, use may be made of an atmosphere which contains from 2 to 100 volume percentages of available oxygen, e.g. a nitrogen-oxygen mixture. The rectifying action is promoted when the electrode pigment is fired at a temperature range of 600° C. to 900° C.

Semiconductive barium titanate is made in per se conventional manner. Equimolecular mixture of titanium oxide and barium carbonate is wet milled with 1.6 wt. percent of silver oxide, 0.22 wt. percent of aluminum oxide, 0.37 wt. percent of silicon oxide and 0.3 wt. percent of titanium oxide, pressed into tablets 10 mm. in diameter and 2 mm. thick, and sintered at 1380° C. for 2 hours in nitrogen atmosphere. The sintered product, black in color, is 8 mm. in diameter and 1 mm. thick and has 0.6 ohm of electrical resistance. The grain size is 20 to 60 microns in diameter. These materials are then treated to rectifying contact electrode at spaced portions thereof. Electrode compositions containing silver, lead oxide and bismuth oxide are prepared by using mixed powder, the particles of which are 0.05 to 2 microns in diameter. The pigment compositions are mixed with conventional organic binder such as polyester to form paste. The paste is painted on one surface of the semiconductive barium titanate, fired at 820° C. in air for 10 minutes and cooled to room temperature (20° C. to 30° C.). The thus-prepared materials are subsequently treated to provide ohmic contact on the other surface of the semiconductor in order to obtain the above-mentioned electrical characteristics. A coating method is carried out by evaporating an electrode material, for example, aluminum metal. Generally copper metal is evaporated on the aluminum electrode to facilitate soldering lead wire. Electrical properties are measured by a per se well known method.

The following examples of presently preferred embodiments illustrate the specified novel rectifiers of this invention but are not intended to be construed as limitative.

EXAMPLES 1-5

The following pastes are painted and air-fired at 820° C. for 10 minutes in the manner hereinbefore described:

TABLE

| Sample No. | Composition, Molar Ratio of $Pb_3O_4$ to $Bi_2O_3$ | Weight silver | Percentages additives |
|---|---|---|---|
| 1* | | | |
| 2 | 1.0 | 100 | 0 |
| 3 | 1.0 | 90 | 10 |
| 4 | 1.0 | 80 | 20 |
| 5 | 1.0 | 70 | 30 |

*1—Conventional Si-varistor.

The voltage dependence of the current in the forward direction is graphically illustrated in FIG. 5. A voltage characterized by an abrupt rise in forward current is readily controlled by changing the weight percentages of the additive combination. The present ceramic rectifier exhibits higher varistor-voltage and smaller $\beta$ than a conventional Si-varistor.

The present circuit elements are suited for use in transistorized bias circuits to stabilize voltage.

What is claimed is:

1. A ceramic rectifier comprising a semiconductive titanate plate having a non-ohmic electrode on one surface thereof and an ohmic electrode on the other surface thereof, said non-ohmic electrode consisting essentially of, as solid ingredients, 68 to 92.4% by weight of silver metal and 7.2 to 32% by weight of an additive combination of lead oxide and bismuth oxide in a mol ratio of 0.5 to 1.50 of lead oxide to bismuth oxide.

2. A ceramic rectifier according to claim 1, wherein said non-ohmic electrode consists essentially of, as solid ingredients, 75 to 90% by weight of silver metal and 10 to 25% by weight of an additive combination of lead oxide and bismuth oxide in a mol ratio of 0.75 to 1.25 of lead oxide to bismuth oxide.

3. A ceramic rectifier according to claim 2, wherein said semiconductive titanate plate consists essentially of barium titanate.

4. A ceramic rectifier according to claim 2, wherein said barium titanate includes, as additives, 0.10 to 4.20 wt. percent of silver oxide, 0.015 to 3.950 wt. percent of aluminum oxide, 0.015 to 4.10 wt. percent of silicon oxide and 0.04 to 1.80 wt. percent of titanium oxide.

5. A ceramic rectifier according to claim 3, wherein said semiconductive titanate plate comprises barium titanate plate characterized by grain size of 15 to 70 microns and electrical resistivity less than 10 ohm-cm.

6. A ceramic rectifier according to claim 3, wherein said ohmic electrode comprises aluminum metal.

7. A method for making a ceramic rectifier comprising providing a semiconductive titanate ceramic body; applying, to one surface of said ceramic body, an electrode pigment consisting essentially of, as solid ingredients, 68 to 92.4% by weight of silver metal and 7.2 to 32% by weight of an additive combination of lead oxide and bisumth oxide in a mol ratio of 0.5 to 1.50 of lead oxide to bismuth oxide; firing said electrode pigment at 600° C. to 900° C. in an oxidizing atmosphere whose oxygen content ranges from 2 to 100% by volume; cooling said fired body having said electrode pigment to room temperature in said oxidzing atmosphere; and applying, to another surface of said ceramic body, an aluminum electrode.

References Cited

UNITED STATES PATENTS

| | | | |
|---|---|---|---|
| 3,268,783 | 8/1966 | Saburi | 317—230 |
| 3,321,683 | 5/1967 | Tatem | 317—258 |
| 3,351,500 | 11/1967 | Khauri | 317—230 X |
| 3,419,759 | 12/1968 | Hayakawa | 317—230 |

JAMES D. KALLAM, Primary Examiner

U.S. Cl. X.R.

317—230